United States Patent
Saurabh et al.

(10) Patent No.: US 12,061,924 B2
(45) Date of Patent: Aug. 13, 2024

(54) METHOD AND SYSTEM FOR WEB SERVICE LOCATION ALLOCATION AND VIRTUAL MACHINE DEPLOYMENT

(71) Applicant: Tata Consultancy Services Limited, Mumbai (IN)

(72) Inventors: Saket Saurabh, Pune (IN); Arun Ramamurthy, Pune (IN); Mangesh Sharad Gharote, Pune (IN); Sachin Premsukh Lodha, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 470 days.

(21) Appl. No.: 17/564,475

(22) Filed: Dec. 29, 2021

(65) Prior Publication Data

US 2022/0357969 A1  Nov. 10, 2022

(30) Foreign Application Priority Data

Mar. 24, 2021 (IN) .............................. 202121012821

(51) Int. Cl.
  *G06F 9/455* (2018.01)
  *G06F 9/48* (2006.01)
  *G06F 9/50* (2006.01)

(52) U.S. Cl.
  CPC ........ *G06F 9/45558* (2013.01); *G06F 9/4881* (2013.01); *G06F 9/5077* (2013.01);
  (Continued)

(58) Field of Classification Search
  CPC .. G06F 9/45558; G06F 9/4881; G06F 9/5077; G06F 2009/4557; G06F 2009/45595; G06F 2209/501
  See application file for complete search history.

(56) References Cited

U.S. PATENT DOCUMENTS

2024/0086240 A1\* 3/2024 Helstroom ............ G06F 9/5083

OTHER PUBLICATIONS

Gopu et al., "Multiobjective Virtual Machine Placement Using Evolutionary Algorithm with Decomposition," (2020).

(Continued)

*Primary Examiner* — Diem K Cao
(74) *Attorney, Agent, or Firm* — FINNEGAN, HENDERSON, FARABOW, GARRETT & DUNNER LLP

(57) ABSTRACT

Finding optimal solutions to Web Service Location Allocation Problem (WSLAP) using exhaustive algorithms and exact approaches is not practical. Computational time required to solve WSLAP using exact approaches increases exponentially with the problem size. The disclosure herein generally relates to service deployment, and, more particularly, to a method and system for web service location allocation and virtual machine deployment. The system identifies a plurality of web-services that are associated with the WSLAP and then decomposes the WSLAP to a plurality of sub-problems. For each sub-problem, the system determines at least one non-dominating solution, which are then merged to generate the solution for the WSLAP. The generated solution to the WSLAP can be used for perform Virtual Machine (VM) deployment under uncertainties, using a stochastic approach, wherein the uncertainties refer to dynamic change in requirements in terms of parameters such as but not limited to configuration, and cost.

15 Claims, 9 Drawing Sheets

(52) U.S. Cl.
CPC .............. *G06F 2009/4557* (2013.01); *G06F 2009/45595* (2013.01); *G06F 2209/501* (2013.01)

(56) References Cited

OTHER PUBLICATIONS

Liu et al., "A Multi-Objective Chance-Constrained Programming Approach for Uncertainty-Based Optimal Nutrients Load Reduction at the Watershed Scale," Water, 9:322 (2017).

Tan et al., "Optimization of Location Allocation of Web Services Using a Modified Non-dominated Sorting Genetic Algorithm," (2016).

Tan et al., "Evolutionary Multi-Objective Optimization for Web Service Location Allocation Problem," IEEE Transactions on Services Computing (2018).

Yang et al., "Multi-Objective Chance Constrained Programming of Spare Parts Based on Uncertainty Theory," 6 (2018).

\* cited by examiner (a) $W_1(110, 2000)$ (b) $W_1(260, 1250)$ (c) $W_2(100, 2140)$ (d) $W_1(230, 1300)$ (e) $W_3(110, 2660)$ (f) $W_3(230, 1550)$

METHOD AND SYSTEM FOR WEB SERVICE LOCATION ALLOCATION AND VIRTUAL MACHINE DEPLOYMENT

PRIORITY CLAIM

This U.S. patent application claims priority under 35 U.S.C. § 119 to: India Application No. 202121012821, filed on Mar. 24, 2021. The entire contents of the aforementioned application are incorporated herein by reference.

TECHNICAL FIELD

The disclosure herein generally relates to service deployment, and, more particularly, to a method and system for web service location allocation and virtual machine deployment.

BACKGROUND

Service oriented computing using web services has emerged as a new computing paradigm for developing software applications. Web services are self-describing, platform-agnostic computational elements that support rapid and low-cost composition of software applications. These services offered by different enterprises can be accessed over the internet. Thus, they provide a distributed computing infrastructure for both intra- and cross-enterprise application integration and collaboration. As the number of functionally similar web services is consistently increasing, Quality of Service (QoS) has become a key to gain competitive advantage over other service providers. An important attribute that determines web service's QoS is its response time. Hence, choosing appropriate web service locations to serve geographically distributed user centers has a significant impact on QoS and customer satisfaction. While deploying a web service closer to each user center improves the service response time, however setting up a web service at multiple locations invariably increases the deployment cost. There could also be multiple web services to be deployed. This problem of locating multiple web services with the aim of simultaneously minimizing two conflicting objectives, total deployment cost and network latency, is known as web services location allocation problem (WSLAP).

To find optimal solutions to WSLAP using exhaustive algorithms and exact approaches is not practical. The computational time required to solve WSLAP using exact approaches such as Integer Linear Programming (ILP), and branch and bound algorithm, increases exponentially with the problem size. Further, finding multiple Pareto-optimal solutions using exact methods is challenging.

Also, while a Virtual Machine deployment scenario is considered, a problem being faced by the state of the art approaches is dynamically varying user requirements. For example, in the beginning of the VM deployment the user may have opted for VMs with certain configuration and in a particular price range. However, during the runtime, the requirements may change i.e. the user may opt for VMs with a different configuration or price range. State of the art systems fail to address such dynamic requirements, as for each change, an entire deployment process may have to be changed/updated.

SUMMARY

Embodiments of the present disclosure present technological improvements as solutions to one or more of the above-mentioned technical problems recognized by the inventors in conventional systems. In an aspect, a processor implemented method of performing web services location allocation is provided. In this method, initially a Web Service Location Allocation Problem (WSLAP) is collected as input, via one or more hardware processors. Further, a plurality of web-services that are associated with the WSLAP are identified, via the one or more hardware processors. The WSLAP is then decomposed to a plurality of sub-problems, via the one or more hardware processors, by treating each of the plurality of web services as a sub-problem. Further, at least one non-dominating solution is identified to each of the plurality of sub-problems, via the one or more hardware processors. Further, a solution to the obtained WSLAP is generated by merging a plurality of the non-dominating solutions of the plurality of sub-problems, via the one or more hardware processors, wherein the solution determines a plurality of locations in a cloud space where a plurality of VM resources providing the plurality of web-services are to be deployed according to a users' locations and invocation frequencies.

In another aspect, a method of merging the plurality of the non-dominating solutions to generate the solution to the WSLAP is provided. In this method, a plurality of sub-solutions is generated by merging two of the plurality of the non-dominating solutions at once. Merging each of the plurality of sub-solutions further includes the following steps. A first set of non-dominated solutions (E1) and a second set of non-dominated solutions (E2) are collected as input data to construct a solution table, wherein in the solution table a plurality of solutions are listed such that position of each solution in the solution table is represented using a unique combination of row number and column number, wherein the row number is an index from E2 and column number is an index from E1, further wherein value of element at any position in the solution table is a vector sum of values in E1 and E2 at respective locations. Further, a stack N is initialized, and a dummy solution is pushed to the stack. Further, a first tuple is generated as a summation of first non-dominating solutions in E1 and E2, starting from top left corner of the solution table, and the first tuple is then added to a Heap H, wherein the first tuple comprises a summation of first objective (f1) and a second objective (f2) of the first non-dominating solutions in E1 and E2. Further, the following steps are iteratively performed till the sub-solution is generated: a) a root node is removed from the Heap H, wherein the root node contains lowest value of all elements of f1 present in the Heap, b) the removed root node is pushed to the stack, if value of f2 in the root node is less than value of f2 in top of the stack, c) for the root node, one or more solutions are selected from the tuples in the solution table, wherein the one or more solutions are in a location that is to immediate right or immediate bottom to the location of the value in the root node, and d) the selected one or more solutions are added to the Heap. Once the sub-solutions are generated, they are merged to generate the solution for the WSLAP.

In yet another aspect, the first tuple is generated as a summation of the last non-dominating solutions in E1 and E2, starting from bottom right corner of the solution table, wherein if the first non-dominating solution is collected starting from the bottom right corner of the solution table, for the root node the one or more solutions in a location that is to immediate left or immediate top to the location of the value in the root node are selected and added to the Heap.

In yet another aspect, the first tuple is generated by performing in parallel, selection of the first non-dominating solutions starting from a) bottom right corner of the solution table and b) top left corner of the solution table.

In yet another aspect, the merging of the non-dominating sub-solutions may be performed in different ways. In one embodiment, the sub-solutions may be sequentially merged, for example, E1-E2, E3-E4, and so on. In another embodiment, after merging the sub-solutions of E1 and E2, resulting sub-solution is merged with sub-solution of E3, and then the non-dominated sub-solutions of ((E1-E2)-E3) are merged with the non-dominated solutions of E4 and so on. In yet another embodiment, the merging of the sub-solutions may be performed in parallel. For example, the sub-solutions of E1 and E2 are merged, and at the same time the sub-solutions of E3 and E4 are merged. The parallel merging may be less time consuming.

In yet another aspect, the generated solution to the WSLAP is used for performing Virtual Machine (VM) deployment under uncertainties, using a stochastic approach, wherein the uncertainties refer to dynamic change in requirements in terms of parameters such as but not limited to configuration, and cost.

In yet another aspect, a system of performing web service location allocation is provided. The system includes one or more hardware processors, a communication interface, and a memory operatively coupled to the one or more hardware processors via the communication interface. The memory stores a plurality of instructions, which when executed, causes the one or more hardware processors to perform the following steps. In this method, initially a Web Service Location Allocation Problem (WSLAP) is collected as input, via one or more hardware processors. Further, a plurality of web-services that are associated with the WSLAP are identified, via the one or more hardware processors. The WSLAP is then decomposed to a plurality of sub-problems, via the one or more hardware processors, by treating each of the plurality of web services as a sub-problem. Further, at least one non-dominating solution is identified to each of the plurality of sub-problems, via the one or more hardware processors. Further, a solution to the obtained WSLAP is generated by merging a plurality of the non-dominating solutions of the plurality of sub-problems, via the one or more hardware processors, wherein the solution determines a plurality of locations in a cloud space where a plurality of VM resources providing the plurality of web-services are to be deployed according to a users' locations and invocation frequencies.

In yet another aspect, a system for generating the solution to the WSLAP by merging the plurality of the non-dominating solutions is provided. The system generates a plurality of sub-solutions by merging two of the plurality of the non-dominating solutions at once, by executing the following steps: A first set of non-dominated solutions (E1) and a second set of non-dominated solutions (E2) are collected as input data to construct a solution table, wherein in the solution table a plurality of solutions are listed such that position of each solution in the solution table is represented using a unique combination of row number and column number, wherein the row number is an index from E2 and column number is an index from E1 further wherein value of element at any position in the solution table is a vector sum of values in E1 and E2 at respective locations. Further, a stack N is initialized, and a dummy solution is pushed to the stack. Further, a first tuple is generated as a summation of first non-dominating solutions in E1 and E2, starting from top left corner of the solution table, and the first tuple is then added to a Heap H, wherein the first tuple comprises a summation of first objective (f1) and a second objective (f2) of the first non-dominating solutions in E1 and E2. Further, the following steps are iteratively performed till the sub-solution is generated: a) a root node is removed from the Heap H, wherein the root node contains lowest value of all elements of f1 present in the Heap, b) the removed root node is pushed to the stack, if value of f2 in the root node is less than value of f2 in top of the stack, c) for the root node, one or more solutions are selected from the tuples in the solution table, wherein the one or more solutions are in a location that is to immediate right or immediate bottom to the location of the value in the root node, and d) the selected one or more solutions are added to the Heap. Once the sub-solutions are generated, they are merged to generate the solution for the WSLAP.

In yet another aspect, a non-transitory computer readable medium for performing web services location allocation is provided. The non-transitory computer readable medium includes a plurality of instructions, which when executed via one or more hardware processors, causes the web services location allocation via the following steps. Initially a Web Service Location Allocation Problem (WSLAP) is collected as input. Further, a plurality of web-services that are associated with the WSLAP are identified. The WSLAP is then decomposed to a plurality of sub-problems, by treating each of the plurality of web services as a sub-problem. Further, at least one non-dominating solution is identified to each of the plurality of sub-problems. Further, a solution to the obtained WSLAP is generated by merging a plurality of the non-dominating solutions of the plurality of sub-problems, wherein the solution determines a plurality of locations in a cloud space where a plurality of VM resources providing the plurality of web-services are to be deployed according to a users' locations and invocation frequencies.

In yet another aspect, a non-transitory computer readable medium for generating the solution to the WSLAP by merging the plurality of the non-dominating solutions, is provided. A plurality of instructions in the non-transitory computer readable medium, when executed, causes to generate the solution to the WSLAP by merging the plurality of the non-dominating solutions, via the following steps. In this approach, a plurality of sub-solutions are generated by merging two of the plurality of the non-dominating solutions at once. Generating each of the plurality of sub-solutions further includes the following steps. A first set of non-dominated solutions (E1) and a second set of non-dominated solutions (E2) are collected as input data to construct a solution table, wherein in the solution table a plurality of solutions are listed such that position of each solution in the solution table is represented using a unique combination of row number and column number, wherein the row number is an index from E2 and column number is an index from E1, further wherein value of element at any position in the solution table is a vector sum of values in E1 and E2 at respective locations. Further, a stack N is initialized, and a dummy solution is pushed to the stack. Further, a first tuple is generated as a summation of first non-dominating solutions in E1 and E2, starting from top left corner of the solution table, and the first tuple is then added to a Heap H, wherein the first tuple comprises a summation of first objective (f1) and a second objective (f2) of the first non-dominating solutions in E1 and E2. Further, the following steps are iteratively performed till the sub-solution is generated: a) a root node is removed from the Heap H, wherein the root node contains lowest value of all elements of f1 present in the Heap, b) the removed root node is pushed to the stack, if value of f2 in the root node is less than value of f2 in top of the stack, c) for the root node, one or more solutions are selected from the tuples in the solution table, wherein the one or more solutions are in a location that is to immediate right or immediate bottom to the location of the value in the root node, and d) the selected one or more solutions are added to the Heap. Once the sub-solutions are generated, they are merged to generate the solution for the WSLAP.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
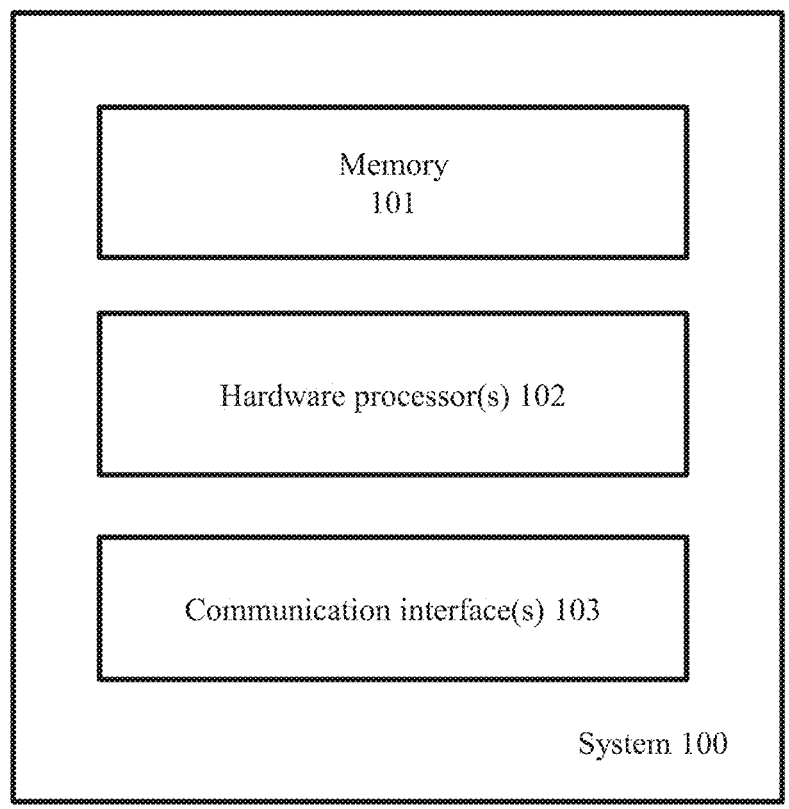
FIG. 1 illustrates an exemplary system for performing web services location allocation, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 6B, where similar reference characters denote corresponding features consistently throughout the figures, there are shown preferred embodiments and these embodiments are described in the context of the following exemplary system and/or method.

FIG. 1 illustrates an exemplary system 100 for performing web services location allocation, according to some embodiments of the present disclosure. The system 100 includes one or more hardware processors 102, communication interface(s) or input/output (I/O) interface(s) 103, and one or more data storage devices or memory 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory 101 may include any computer-readable medium known in the art including, for example, volatile memory, such as static random-access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more components (not shown) of the system 100 can be stored in the memory 101. The memory 101 is configured to store a plurality of operational instructions (or 'instructions') which when executed cause one or more of the hardware processor(s) 102 to perform various actions associated with the process of Web Service Location Allocation Problem (WSLAP) and VM allocation being performed by the system 100. The system 100 can be implemented in a variety of ways as per requirements. Various steps involved in the process of Web Service Location Allocation Problem (WSLAP) being performed by the system 100 of FIG. 1 are depicted in FIG. 2 through FIG. 4B, and are explained with reference to the hardware components depicted in FIG. 1.

Figure 2:
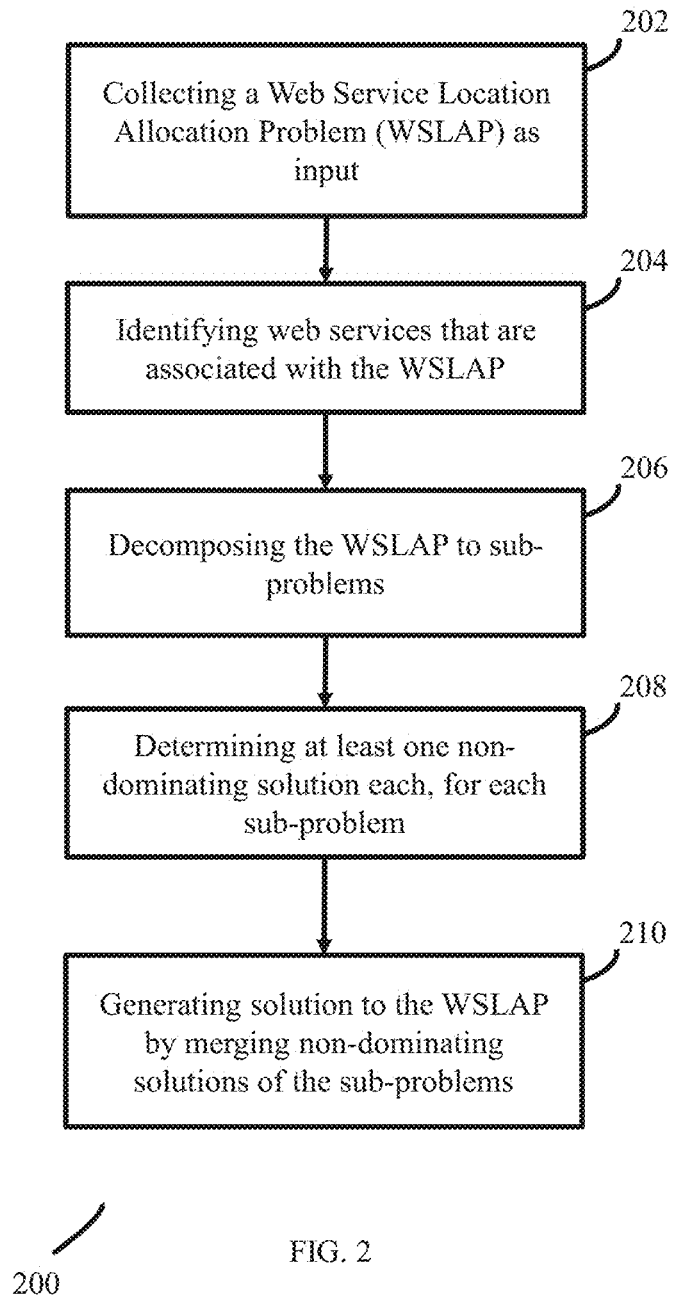
FIG. 2 is a flow diagram depicting steps in a method of performing web services location allocation, by the system of FIG. 1, according to some embodiments of the present disclosure.
Figure 3:
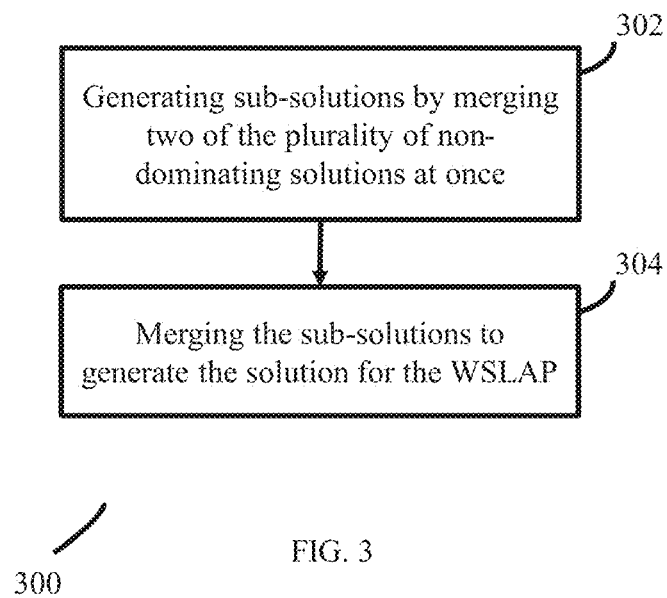
FIG. 3 is a flow diagram depicting steps involved in the process of generating solution to the WSLAP by merging non-dominating solutions, by the system of FIG. 1, in accordance with some embodiments of the present disclosure.
Figure 4A:
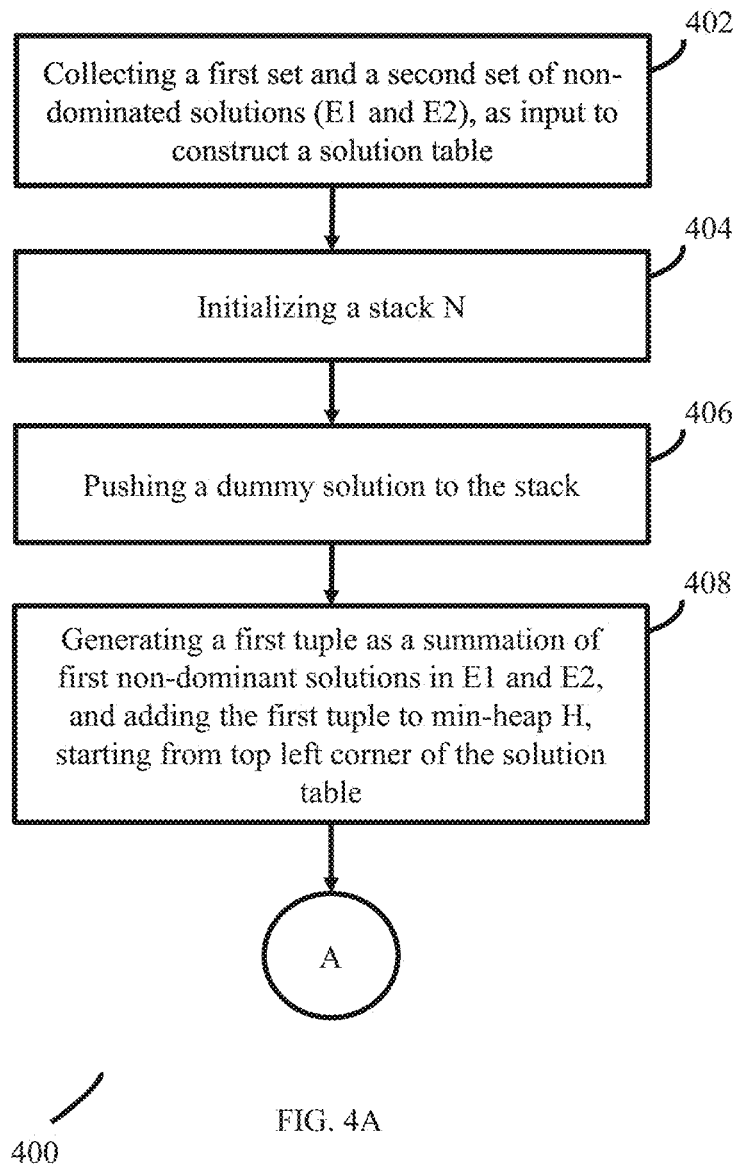
FIGS. 4A and 4B are flow diagrams depicting steps involved in the process of generating sub-solutions from the non-dominating solutions, by the system of FIG. 1, according to some embodiments of the present disclosure.
Figure 4B:
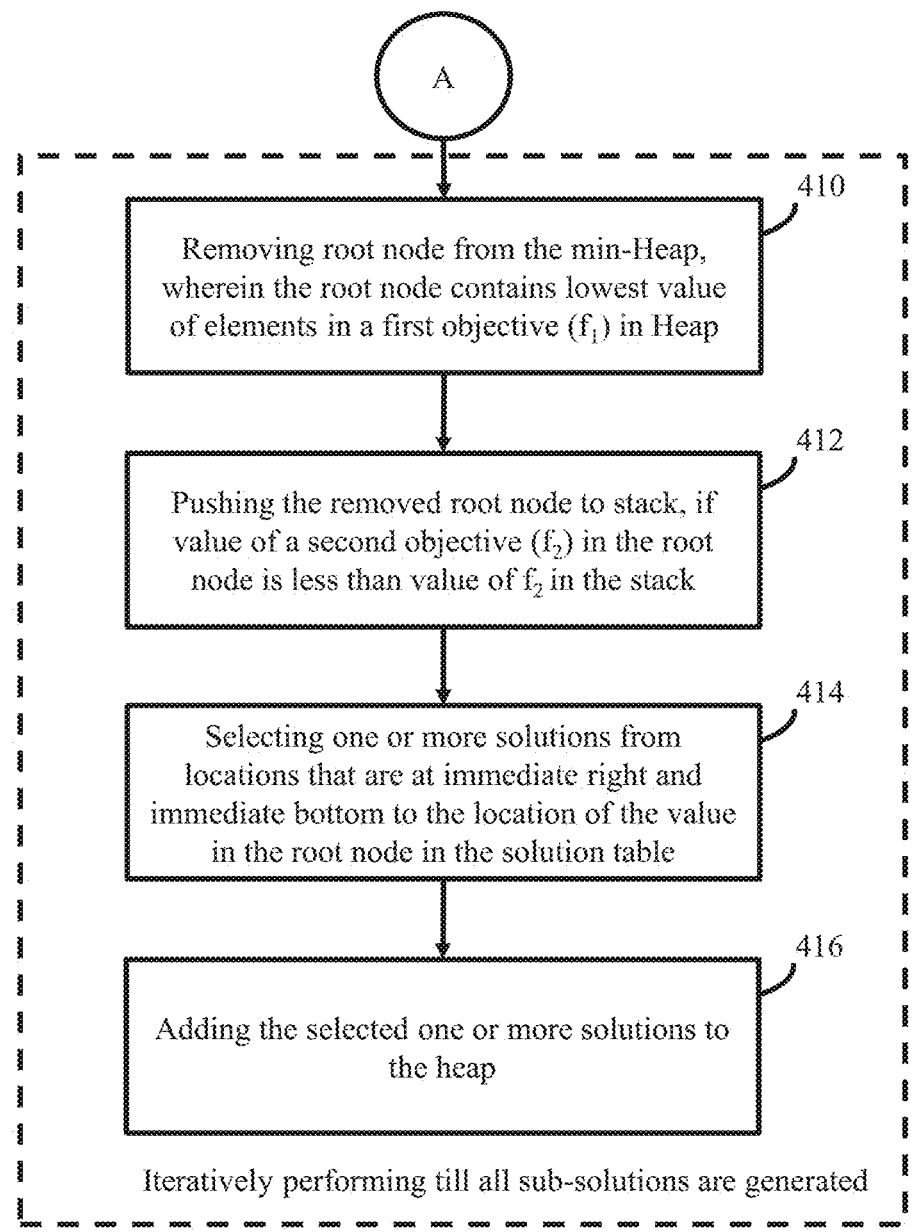

FIG. 2 is a flow diagram depicting steps in a method 200 of performing web services location allocation, by the system of FIG. 1, according to some embodiments of the present disclosure. In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2 through FIG. 4B. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of the method 200, the system 100 collects a Web Service Location Allocation Problem (WSLAP) as input. The WSLAP specifies requirements for allocations of the web services, in terms of various parameters. The WSLAP is described as below:

A set of s web services $W=\{W_1, W_2, W_3, \ldots W_s\}$ needs to be deployed at one or more of n candidate locations $A=\{A_1, A_2, A_3, \ldots A_n\}$. The locations could be data centers of an enterprise and/or one or more cloud providers. Cost incurred in deploying a web service $W_i$ at a location $A_j$ is given as $C_{ij}$. Deployment cost varies from one data centre to another, based on parameters such as but not limited to electricity price, real-estate price, labor cost and so on.

Consider that there are m user centers $U=\{U_1, U_2, U_3, \ldots U_m\}$ that require access to each of the s web services (Note: Not all user centers require access to all web services). A user center represents a geographic region. It also allows us to estimate the latency between the user center and candidate locations. The service invocation frequency (demand) of a web service $W_1$, from a user centre $U_k$ over a unit time interval is represented as $F_{ki}$. The service frequencies are computed as average number of invocations over a period of time such as over a month. The network latency between a user center $U_k$ and a location $A_j$ is given as $L_{kj}$. Each service has to be deployed in at least one location. Further, a service can be deployed at multiple locations to improve its response time. The requirement of a user center pertaining to a given web service is catered by exactly one location. The matrices required for modelling the input in WSLAP problem are given in Table I.

TABLE 1

| Matrix | Entry | Description |
|---|---|---|
| $W_{s+1}$ | $W_i$ | $i^{th}$ web service |
| $A_{n+i}$ | $A_j$ | $j^{th}$ location |
| $U_{m+1}$ | $U_k$ | $k^{th}$ user centre |
| $F_{m+s}$ | $F_{ki}$ | Frequency invocation of service $W_i$ at user centre $U_k$ |
| $C_{s+n}$ | $C_{ij}$ | Cost of deploying service $W_i$ at location $A_j$ |
| $L_{m+n}$ | $L_{kj}$ | Latency between user centre $U_K$ at location $A_j$ |
| $X_{s+n}$ | $X_{ij}$ | Decision variable indicating whether service $W_i$ is deployed at location $A_j$ |

A mathematical model of the WSLAP is given as:

$$\text{minimize } f_1 = \Sigma_{i=1}^{s} \Sigma_{j=1}^{n} C_{ij} \cdot X_{ij} \quad (1)$$

$$\text{minimize } f_2 = \Sigma_{k=1}^{m} \Sigma_{i=1}^{s} R_{ki} \cdot F_{ki} \quad (2)$$

Subject to $$\Sigma_{j=1}^{n} X_{ij} \geq 1, \forall i \in \{1, \ldots, s\} \quad (3)$$

$$X_{ij} \in \{0, 1\} \; \forall_i \in \{1, \ldots, s\}, \forall_j \in \{1, \ldots, n\} \quad (4)$$

Objective of the WSLAP is to locate a set of web services W among the set of candidate locations A such that the deployment cost $f_1$ and a total response time $f_2$ are minimized. A service location matrix X of size s*n is used to represent entire location plan. Value of a decision variable $X_{ij}$ is kept as 1 if the web service $W_i$ is deployed at location $A_j$, otherwise is kept at 0. To minimize latency, each user center is served from the nearest web service location among the set of deployed locations. $R_{ki}$ represents a minimal response time incurred when the web service $W_i$ is accessed by the user centre $U_k$ and is calculated as:

$$R_{ki} = \min \{L_{kj} | X_{ij} = 1 \& j \in \{1, \ldots, n\}\} \quad (5)$$

As the dimensions of the service location matrix X is s*n and each entry takes a binary value 0 or 1 the size of the search space for the WSLAP is $2^{s*n}$.

Each solution for the WSLAP is a tuple (a, b), where a represents the total deployment cost ($f_1$) and b represents the total latency ($f_2$). A solution $\theta_i=(a_i, b_i)$ is said to dominate the solution $\theta_j=(a_j, b_j)$, if $\theta_i$ is at least as good as (in terms of values) $\theta_j$ in one objective and is better in another objective i.e.:

$$a_i < a_j \text{ and } b_i < b_j \text{ or}$$

$$a_i \leq a_j \text{ and } b_i < b_j$$

A solution $\theta^*$ considered as non-dominated solutions (pareto-optimal) if it is not dominated by any other solution. For example, consider the solutions:

$$\theta_1 = (10, 20), \theta_2 = (15, 30), \theta_3 = (5, 25)$$

Figure 5A:
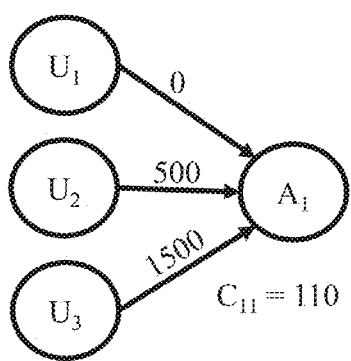
FIGS. 5A and 5B depict example diagrams of the non-dominating solutions, generated by the system of FIG. 1, in accordance with some embodiments of the present disclosure.
Figure 5A:
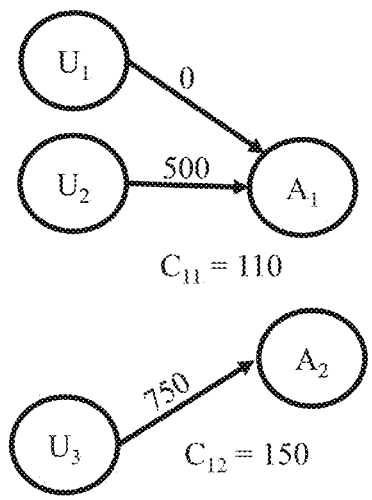
Figure 5A:
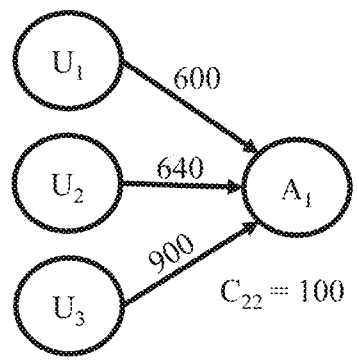
Figure 5A:
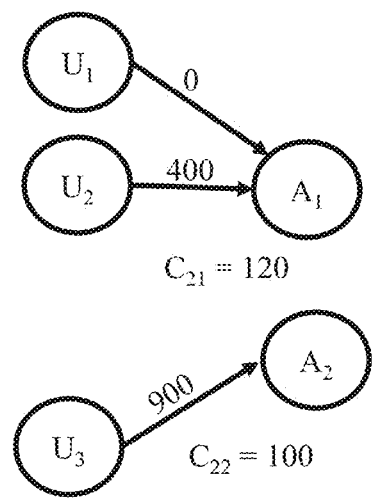
Figure 5B:
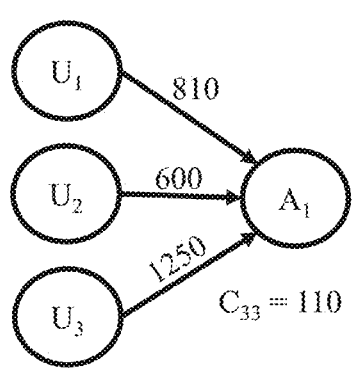
Figure 5B:
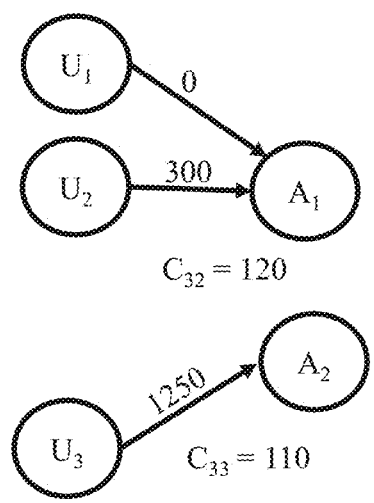

$\theta_1$ and $\theta_3$ are considered to be dominating $\theta_2$, as values of $\theta_1$ and $\theta_3$ are better than that of $\theta_2$. Also, value of first objective of $\theta_1$ is greater than that of $\theta_3$ and value of the second objective of $\theta_1$ is lesser than that of $\theta_3$. Hence $\theta_1$ and $\theta_3$ are considered as non-dominated solutions. This is depicted in FIGS. 5A and 5B with some examples. (a) in 5A depicts that deploying the web service $W_1$ at location $A_1$ results in low cost (110, 2000), however, deploying $W_1$ additionally at $A_2$ minimizes latency (260, 1250). Similar examples are given in (b) through (f) in FIGS. 5A and 5B.

Further, to accommodate an upper limit ($d_i$) on number of locations that may be considered for deploying the web services, from among the total number of locations (n), the WSLAP constraint in equation (3) is modified as:

$$1 \leq \Sigma_{j=1}^{n} X_{ij} \leq d_i, d_i \leq n \forall i \in \{1, \ldots, s\} \quad (6)$$

At step 204, the system 100 identifies all web services that are associated with the WSLAP, by processing the WSLAP collected as input. The number of web services may be different for different WSLAPs. Further, at step 206, the system 100 decomposes the WSLAP to a plurality of sub-problems. In an embodiment, decomposing the WSLAP to the plurality of sub-problems involves considering each of the plurality of web services associated with the WSLAP as individual sub-problem. The step of 206 can be further explained as given below:

The first objective in equation (1) can be rewritten as:

$$f_1 = \Sigma_{j=1}^{n}(C_{1j} \cdot X_{1j} + C_{2j} \cdot X_{2j} + \ldots + C_{sj} \cdot X_{sj}) = \\ (\Sigma_{j=1}^{n} C_{1j} \cdot X_{1j}) + (\Sigma_{j=1}^{n} C_{2j} \cdot X_{2j}) + \ldots + (\Sigma_{j=1}^{n} C_{sj} \cdot X_{sj}) = \text{Cost of } W_1 + \text{Cost of } W_2 + \ldots + \text{Cost of } W_s$$

If deployment cost of web service $W_i$ is denoted as $f_{1_i}$, the above equation can be rewritten as:

$$f_1 = f_{1_1} + f_{1_2} + \ldots + f_{1_s} \quad (7)$$

Similarly, the second objective in equation (2) can be rewritten as:

$$f_2 = \Sigma_{k=1}^{m}(R_{k1} \cdot F_{k1} + R_{k2} \cdot F_{k2} + \ldots + R_{ks} \cdot F_{ks}) = \\ (\Sigma_{k=1}^{m} R_{k1} \cdot F_{k1}) + (\Sigma_{k=1}^{m} R_{k2} \cdot F_{k2}) + \ldots + (\Sigma_{k=1}^{m} R_{ks} \cdot F_{ks}) = \text{Latency of } W_1 + \text{Latency of } W_2 + \ldots + \text{Latency of } W_s$$

If the latency of web service $W_i$ is denoted as $f_{2_i}$, the above equation can be rewritten as:

$$f_2 = f_{2_1} + f_{2_2} + \ldots + f_{2_s} \quad (8)$$

The constraint of WSLAP given in equation (3) can be decomposed to s sub-constraints as:

$$1 \leq \sum_{j=1}^{n} X_{1j}$$

$$1 \leq \sum_{j=1}^{n} X_{2j}$$

- - -

$$1 \leq \sum_{j=1}^{n} X_{sj} \quad (9)$$

Similarly, the constraint given in equation (6) that upper-bounds the number of deployment locations for each web service can be decomposed as follows:

$$1 \leq \sum_{j=1}^{n} X_{1j} \leq d_1$$

$$1 \leq \sum_{j=1}^{n} X_{2j} \leq d_2$$

- - -

$$1 \leq \sum_{j=1}^{n} X_{sj} \leq d_s \quad (10)$$

The equations in (7), (8), and (10) are grouped to model the location allocation problem for a single web service $W_i$ as:

$$\text{minimize } f_{1_i} = \sum_{j=1}^{n} C_{ij} \cdot X_{ij} \quad (10)$$

$$\text{minimize } f_{2_i} = \sum_{k=1}^{m} R_{ki} \cdot F_{ki} \quad (11)$$

subject to:

$$1 \leq \sum_{j=1}^{n} X_{1j} \leq d_i \quad (12)$$

$$X_{ij} \in \{0, 1\} \; \forall j \in \{1, \ldots, n\} \quad (13)$$

$$R_{ki} = \min \{L_{kj} | X_{ij} = 1 \text{ and } j \in \{1, \ldots, n\}\} \quad (14)$$

In a solution $(f_{1_i}, f_{2_i})$ for web service $W_i$ is not a non-dominating solution, then the corresponding solution $(f_1, f_2)$ to the WSLAP also is not a non-dominating solution. Also, if an invocation frequency and the deployment cost of a web service $W_i$ are same as that of another web service $W_g$, then the solution for $W_g$ can be obtained using solution of $W_i$ and vice-versa.

As each sub-problem is relatively smaller and independent, efficiency with which they can be solved is comparatively high. Further, as the WSLAP is being solved at sub-problems level, whenever a new web service is added, the same approach of solution identification can be used, without having to change the process, hence is very scalable in nature to accommodate every addition of web services. Further, in some applications the deployment cost and frequency distribution of some of the web services may be the same, and hence value of deployment cost and frequency distribution calculated for one web service may be reused for the other web services.

Further, at step 208 the system 100 determines at least one non-dominating solution for each of the plurality of sub-problems. The system 100 may use any suitable technique/approach for determining the non-dominating solutions for the plurality of sub-problems. Some examples of the techniques that may be used by the system 100 for generating the non-dominated solutions are, but not limited to, Genetic Algorithm, Particle Swarm Optimization, and Integer Programming. In an embodiment, the system 100 may solve multiple subproblems in parallel, which helps in decreasing run time. A set of all the non-dominating solutions S is represented as:

$$S = \{S_1, S_2, S_3, \ldots S_n\} \quad (15)$$

Further, at step 210, the system 100 generates solution to the WSLAP collected as input, by merging the plurality of the non-dominating solutions determined and generated at step 208. The system 100 uses a merging process to merge the plurality of the non-dominating solutions. The merging process at a broad level has two steps as depicted in method 300 of FIG. 3. At step 302 of the method 300, the system 100 generates a plurality of sub-solutions, wherein each of the sub-solutions is generated by merging two non-dominating solutions at a time. In alternate embodiments, more than two non-dominating solutions are merged at once. However, the merging process is explained with reference to two non-dominating solutions at a time. Various steps in the process of generating a sub-solution by merging two of the non-dominating solutions are depicted in method 400 of FIGS. 4A and 4B. The method 400 is explained hereafter.

A plurality of sets $S_1, S_2, \ldots, S_n$ of non-dominating solutions are considered by the system 100 to perform the merging process. At step 402 of the method 400, the system 100 collects a first set (E1) and a second set (E2) of the non-dominating solutions, from among the plurality of sets of the non-dominating solutions, as input. In an embodiment, the system 100 starts merging the non-dominating solutions generated for first sub-problem, and then picks and merges the non-dominating solutions of the subsequent sub-problems. In another embodiment, the system 100 may pick and merge the non-dominating solutions in any pre-configured order.

The system 100 uses E1 and E2 as input to construct a solution table. In the solution table, a plurality of solutions are listed such that position of each solution in the solution table is represented using a unique combination of row number and column number, wherein the row number is an index from E2 and column number is an index from E1. Further, value of element at any position in the solution table is a vector sum of values in E1 and E2 at respective locations. The system 100 uses a stack-Heap architecture for performing the merging process. At step 404, the system 100 initializes the stack, and then at step 406, the system 100 pushes a dummy solution to the stack. A large value is used as the dummy solution. For example, $(0, \alpha)$ is the value used as the dummy solution, where Alpha ($\alpha$) is a large number that is pre-defined and configured with the system 100, wherein 'large' is in comparison with the values in the tuples.

Further at step 408, the system 100 generates a first tuple as a summation of first non-dominating solutions in E1 and E2 respectively. The system 100 picks the first non-dominating solutions in E1 and E2 and combines them to generate the first tuple. Likewise, each value in E1 is summed with each value in E2 to generate the other tuples in the solution table. Consider the example values in the tables below:

| | |
|---|---|
| (1, 4) | (E1) |
| (5, 3) | |
| (6, 2) | |
| (13, 1) | |

| | |
|---|---|
| (2, 10) | (E2) |
| (4, 7) | |
| (5, 6) | |
| (7, 5) | |

TABLE 2

(Solution Table)

(3, 14) (7, 13) (8, 12) (15, 11)
(5, 11) (9, 10) (10, 9) (17, 8)
(6, 10) (10, 9) (11,8) (18, 7)
(8,9) (12,8) (13, 7) (20,6)

In this example, values in the solution table are generated as combination of values in E1 and E2. For example, the value (3, 14) is generated as summation of (1, 4) in E1 and (2, 10) in E2. Likewise, the value (5, 11) is generated as summation of (1, 4) from E1 and (4, 7) from E2. Values of summation of the first ion-dominating solution from E1 with every value in E2 forms first column of the solution table. This process is repeated till summation of all the values in E1 and E2 are generated and are filled in the solution table.

Further, the system 100 picks values from the solution table and moves the values between Heap and stack as part of the merging process. The steps are elaborated with reference to the example values in Table 3.

TABLE 3

| Iteration # | Heap H | Stack N |
|---|---|---|
| 1 | (3, 14) | (0, α) |
| 2 | (5, 11) (7, 13) | (3, 14) |
| 3 | (6, 10) (7, 13) | (3, 14) (5, 11) |
| 4 | (7, 13) (8, 9) | (3, 14) (5, 11) (6, 10) |
| 5 | (8, 9) (9, 10) (8, 12) | (3, 14) (5, 11) (6, 10) |
| 6 | (8, 12) (9, 10) | (3, 14) (5, 11) (6, 10) (8, 9) |
| 7 | (9, 10) (15, 11) | (3, 14) (5, 11) (6, 10) (8, 9) |
| 8 | (10, 9) (15, 11) (10, 9) | (3, 14) (5, 11) (6, 10) (8, 9) |
| 9 |  | (3, 14) (5, 11) (6, 10) (8, 9) |
| 10 | (10, 9) (15, 11) | (3, 14) (5, 11) (6, 10) (8, 9) |
| 11 | (11, 8) (15, 11) (12, 8) | (3, 14) (5, 11) (6, 10) (8, 9) (11, 8) |
| 12 |  | (3, 14) (5, 11) (6, 10) (8, 9) (11, 8) |
| 13 | (12, 8) (15, 11) | (3, 14) (5, 11) (6, 10) (8, 9) (11, 8) (13, 7) |
| 14 | (13, 7) (15, 11) | (3, 14) (5, 11) (6, 10) (8, 9) (11, 8) (13, 7) |
| 15 | (15, 11) | (3, 14) (5, 11) (6, 10) (8, 9) (11, 8) (13, 7) |
| 16 | (17, 8) (18, 7) (20, 6) | (3, 14) (5, 11) (6, 10) (8, 9) (11, 8) (13, 7) |

The system 100 picks and adds the first tuple from the solution table to the Heap. In an embodiment, the value in top left corner of the solution table is picked as the first tuple, and is added to the Heap i.e. as in Table 3, the value (3, 14), which is in the top left corner of the solution table is picked first. At step 410, the system 100 removes root node from the Heap tree. The root node contains lowest value of elements in a first objective ($f_1$) in the Heap. In Table 3, the root node contains the value (3, 14) in the first step (as that is the only value present in the Heap at this stage). At step 412, the system 100 pushes the removed root node to the stack, if value of the second objective ($f_2$) in the root node is less than value of $f_2$ in the stack, i.e. the value (3, 14) is compared with the value (0, α). As the value 14 is less than α, the tuple (3, 14) is pushed to the stack.

The system 100 then selects one or more solutions from the solution table, such that the location of each of the one or ore solutions in the solution table is to immediate right or immediate bottom to the location of the value in the root node. In the first step, as the value in the root node is (3, 14), the system 100 selects the solutions/tuples (7, 13) and (5, 11) from the solution table. Location of the tuple (7, 13) is to immediate right of the location of (3, 14) and the location of (5, 11) is to immediate bottom of the location of (3, 14). This process may be terminated by the system 100 when all values in the solution table have been selected and processed.

in an alternate embodiment, the value in bottom left corner of the solution table may be selected as the first tuple i.e. (20, 6) in the solution table in Table. 2. In this case, the system 100 picks values of tuples in locations that are to immediate left and immediate top to the location of the value in the root node in the second iteration and so on. i.e. in the second iteration, the tuples (13, 7) and (18, 7) are selected. This process may be terminated by the system 100 when all values in the solution table have been selected and processed.

In another alternate embodiment, the system may simultaneously pick the tuples that are at top left corner and bottom right corner, as the first tuples. In this approach, the selection of remaining tuples in the solution table is in the order as specified in the aforementioned paragraphs, and the picking of values is terminated at a common point/location in the solution table where both the approaches intersect.

When there are multiple tuples in the Heap, always the value of the tuple in the root node is removed from the heap and is attempted to be inserted to the stack. Since Heap referred to in the embodiment is a min-heap, the root node always has the lowest value with respect to the first objective among all the tuples in the Heap. Also, when the tuple in the root node is found to be dominated by the tuple in top of the stack, the root node tuple is discarded. This process is repeated till all the values in the solution table have been selected and processed. The steps 410-416 are iteratively performed till the sub-solutions for merged E1 and E2 are generated. A merge algorithm that is used by the system 100 to perform merging of the non-dominated solutions is given below:

```
Input : two sets S_i and S_j of non-dominating solutions for services i and j
Output : non-dominating solutions S to the combined problem
  Procedure combineTwo(S_i, S_j)
  S = ⊥
  initialize Heap minH of size r
  minH.add((a_1+c_1, b_1+d_1))
  I = 1
  while(I < r · t)
    S[I] = minH.remove( )
    i = row index of min element S[I]
    j = col index of min element S[I] (list number)
    right = (a_{i+1} + c_j, b_{i+1} + d_j)
    if(top element (a_{i+1}+ c_{j-1}, b_{i+1} + d_{j-1}) is removed from Heap)
//use of boolean flag
      add right to Heap H
    down = (a_i + c_{j+1}, b_i + d_{j+1})
    if(left element (a_{i-1} + c_{j+1}, b_{i-1} + d_{j+1}) is removed from Heap)
//use of boolean flag
      add down to Heap H
    I++
  return front(S)
```

Another version of the merge algorithm is:

```
Input : two sets S_i and S_j of non-dominating solutions for services i and j
Output : non-dominating solutions S to the combined problem
  Procedure combineTwo(S_i, S_j)
  S = [ ]
  initialize Heap minH of size r
  minH.add((a_1+c_1, b_1+d_1))
  I = 1
  while(I < r · t)
    min = minH.remove( )
```

-continued

```
if(min[f₂] < S[I-1][f₂])
    s[I][1] = min[f₁], S[I][2] = min[f₂]
i = row index of min element S[I]
j = col index of min element S[I]
right = (aᵢ₊₁ + cⱼ, bᵢ₊₁ + dⱼ)
    if(top element (aᵢ₊₁+ cⱼ₋₁, bᵢ₊₁+ dⱼ₋₁) is removed from Heap)
//use boolean flag
    add right to Heap H
down = (aᵢ + cⱼ₊₁, bᵢ + dⱼ₊₁)
    if(left element (aᵢ₋₁ + cⱼ₊₁, bᵢ₋₁+dⱼ₊₁) is removed from Heap)
//use boolean flag
    add down to Heap H
I++
return S
```

The steps in method 400 may be repeated to generate sub-solution for remaining non-dominating solutions i.e. E3-E4, E5-E6 and so on. In an embodiment, the sub-solutions generated by the system 100 are non-dominating sub-solutions. After generating all the non-dominating sub-solutions, at step 304, the system 100 may merge the generated non-dominating sub-solutions to generate the solution to the WSLAP, The merging of the non-dominating sub-solutions may be performed in different ways. In one embodiment, the sub-solutions may be sequentially merged, for example, E1-E2, E3-E4, and so on. In another embodiment, after merging the sub-solutions of E1 and E2, resulting sub-solution is merged with sub-solution of E3, and then the non-dominated sub-solutions of ((E1-E2)-E3) are merged with the non-dominated solutions of E4 and so on. In yet another embodiment, the merging of the sub-solutions may be performed in parallel. For example, the sub-solutions of E1 and E2 are merged, and at the same time the sub-solutions of E3 and E4 are merged. The parallel merging may be less time consuming.

The solution to the WSLAP determines a plurality of locations in a cloud space where a plurality of VM resources providing the plurality of web-services are to be deployed according to a users' locations and invocation frequencies.

The system 100 may use the solution generated to solve the WSLAP to perform a Virtual Machine Deployment. In this process, the system 100 obtains a VM deployment requirement, as input, wherein in the VM deployment requirement, resource requirements are dynamically varying. The system 100 then determines a plurality of optimal VM resources from among the plurality of resources in the cloud space, using a stochastic approach, wherein the plurality of optimal VM resources satisfy criteria defined in terms of purchasing cost, storage capacity, processing capacity, maximum limit on number of VMs, and execution time, such that the dynamically varying resource requirements are satisfied.

The stochastic approach used by the system 100 to perform the VM allocation is explained below:

Stochastic Approach for VM Allocation

Various notations that are used for explaining the VM allocation approach are given in Table. 4.

TABLE 4

Notations Description for the Model Parameters

| | |
|---|---|
| C | Set of VM types offered by the cloud provider |
| T | Time horizon |
| $N_M$ | Maximum number of VMs offered in each type |
| N | Set of VM instances in each type = $\{1, 2, \ldots, N_M\}$ |
| $v_c$ | Cost of purchasing VM type c for one time period |
| $s_c$ | Storage capacity for VM type c |
| $m_c$ | Memory capacity for VM type c |
| $r_c$ | Processing capacity for VM type c |
| $T_E$ | Last time period a VM has been allocated (Execution time) |
| $X_{cjt}$ | $\begin{cases} 1, & \text{if VM c of type j is allocated at time t} \\ 0, & \text{otherwise} \end{cases}$ |

For explanation purpose, consider a set of consumer requirements which can be further categorized as application and non-application-based requirements. The former category consists of the following demand requirements: (i) total processing capacity R, (ii) total memory capacity M, and (iii) total storage capacity S. The second category, which is non-application based, includes, the upper limits on a) budget B and b) execution time $T_E$, associated with the deployment of workflow applications in different resources. A cost component, which is the purchasing cost of varying VM types, is considered along-with overall execution time for completion of a specific application. The application is executed faster or in other words, $T_E$ is relatively lowered if high power VMs are used. However, using high power VMs increases the service cost as VM cost increases with increase in computational power. Therefore, there exists an evident trade-off between the two mentioned objectives. The system 100 performs the VM allocation, based on the solution generated for the WSLAP, in such a way that the purchasing cost of VMs and TE are simultaneously minimized, where the decision variables comprise the number of VMs of each configuration that are offered by the provider, the time of usage of each of these VMs and execution time ($T_E$ acts as both decision variable as well as objective function). Additionally, the formulated multi-objective optimization problem contains some constraints based on application and non-application-based users' requirements. These constraints form part of the VM allocation requirement.

In case of the VM deployment, various parameters in the VM allocation requirement keep on varying dynamically. For instance, in order to execute a data mining task, which is computationally intensive, the user may purchase 3 VMs of type 1 and 2 VMs of type 2 for a period of 20 hours, hoping that the task would be completed within that time. However, after completion of around 50% of the task, the customer might change the requirements, either increase or decrease the VMs of each type, or even request for a new type of VM, owing to the computational speed and the status of the usage of resources deployed so far. This flexible nature of users' requirements not only enables them to choose sufficient and appropriate VMs for faster completion of the task, but also helps in eliminating the unnecessary cost of resources. It is to be noted that in most of the cases, the inputs provided by the user keep on varying and are hence termed as uncertain variables.

The system 100 uses the below mentioned stochastic formulation to perform the VM deployment.

$$\min_{x_{cjt}, T_E} \sum_{c \in C} \sum_{j=1}^{N_M} \sum_{t \in T} V_c X_{cjt} \quad (16)$$

$$\min_{x_{cjt}, T_E} T_E \quad (17)$$

subject to, $$\sum_{c \in C} \sum_{j=1}^{N_M} \sum_{t \in T} V_c X_{cjt} \leq B \quad (18)$$

$$\sum_{c \in C} \sum_{j=1}^{N_M} s_c X_{cjt} \leq \xi(1) X_{c'j't} \forall t \in T, c' \in C, j' \in N \quad (19)$$

$$\sum_{c \in C} \sum_{j=1}^{N_M} m_c X_{cjt} \leq \xi(2) X_{c'j't} \forall t \in T, c' \in C, j' \in N \quad (20)$$

$$\sum_{c \in C} \sum_{j=1}^{N_M} \sum_{t \in T} r_c X_{cjt} \leq \xi(3) \quad (21)$$

$$\sum_{j=1}^{N_M} X_{cjt} \leq N_M \forall t \in T, c \in C \quad (22)$$

$$T_E \leq t X_{cjt} \forall t \in T, c \in C, j \in N \quad (23)$$

where, $T_E \in \mathbb{Z}^+$, $\xi = \{\xi(1), \xi(2), \xi(3)\}$ and $$x_{cjt} \in \{0,1\} \forall t \in T, c \in C, j \in N$$

The given stochastic formulation is modeled as a constrained integer linear programming problem, where the decision variables remain unchanged (explained in Table 4), The stochastic model is constructed such that it consists of three uncertain parameters that are present in the equations (19) through (21) and are denoted by the vector $\xi$. Contrary to this, the objective functions (given in equations 16 and 17) are independent of the three uncertain parameters.

To ensure that the uncertainties (in terms of the changing requirements) are taken into consideration while performing the VM deployment, a certain probability value of constraint satisfaction is associated with each of the uncertain constraints.

Consider a standard optimization formulation with uncertain parameter vector $\xi$ and decision variable vector x as shown in equation 24. On application of a Chance Constraint Programming (CPP) framework that is used for the VM deployment, this stochastic optimization can be represented as in equation 25.

$$\min_x \{f(x) | g(x, \xi) \geq 0\} \quad (24)$$

$$\min_x \{f(x) | P(g(x, \xi) \geq 0) \geq p\} \quad (25)$$

where, f(x) and g(x) denote the objective function and constraint respectively. In (25), P represents the measure of probability which varies between 0 to 1 and p represents the probability of constraint satisfaction. Higher the p value, more reliable yet more conservative is the solution. The feasible decision space is progressively lowered as the probability value approaches unity, Prior to estimation of the probability values, the uncertain demand requirements are assumed to follow normal distribution. It is to be noted that the assumption that the demand requirements follow the normal distribution is only an example, and in practice, the system 100 can be configured to work with any distribution. Also, the decision variables and the uncertain parameters are separable in the stochastic model. Owing to these aspects, the stochastic optimization problem in (25) is converted into equivalent deterministic optimization problem shown as follows;

$$\min_x \{f(x) | P(\tilde{g}(x) \geq \xi) \geq p\} \quad (26)$$

$$\Rightarrow \min_x \{f(x) | \tilde{g}(x) \geq \hat{\xi}\} \quad (27)$$

$$\Rightarrow \min_x \{f(x) | \tilde{g}(x) \geq \hat{\xi} + q_p \sigma_\xi\} \quad (28)$$

where, $\hat{\xi}$ and $\sigma_\xi$ represent the mean and standard deviation values for the uncertain parameter $\xi$ and $q_p$ denotes the $p^{th}$ quantile of the standard normal distribution with mean=0 and standard deviation=1 (for instance, when $p=0.97$, $q_p$ corresponds to $q_{0.97}$, which is equal to 2). The second term in the right-hand side of the constraint in (28) ($q_p \sigma_\xi$) corrects the nominal requirement of demand and delivers robustness of the generated optimal allocation of resources under uncertain situations. i.e. the CCP approach also works if the set of decision variables and uncertain parameters are non-separable. By this approach the VM allocation/deployment problem is converted into deterministic form, and further, any classical or evolutionary optimization algorithm can be used for solving it.

Experimental Results a. Results to prove efficacy of the method 200 to generate solution for WSLAP:

During the experiments conducted, efficacy of the WSLAP solution generation approach used by the system 100 was compared with traditional multi-objective evolutionary algorithms (MOEAs) on test instances of different sizes. Specifically, the four algorithms "NSGAII, BMOP-SOCD, D&C NSGAII and D&C BMOPSOCD" were considered. NSGAII and BMOPSOCD are traditional algorithms that solve WSLAP as a single problem without dividing it into subproblems. D&C NSGAII and D&C BMOPSOCD solve the WSLAP by decomposing it into multiple subproblems and by merging the non-dominated solutions of each problem using the proposed merge algorithm. All algorithms were implemented in Python version 3.7 and the experiments were conducted on a Windows 10 machine with i7-8650U 2.11 GHz processor and 16GB of RAM.

The experiment was conducted with 14 different WSLAP instances. The number of services s, locations n and user centers m considered in each test instance is shown in Table 5. The search space of an instance is computed using the number of services and candidate locations ($2^{s.n}$). Since the computation complexity of an instance also depends on the number of user centers, for each search space, the number of user centers is varied. The test instances employ a real-world WSDream dataset for obtaining latency numbers. This dataset contains only latencies between candidate locations and user centers and lacks deployment costs for candidate locations and invocation frequencies for web services. The deployment costs for candidate locations were randomly generated according to a normal distribution with the mean of 100 and standard deviation of 20. The invocation frequencies also were randomly generated for user centers from a uniform distribution between 1 and 120.

TABLE 6

| Instance | Services | Locations m | User centres n | Search space $2^{s \cdot n}$ |
|---|---|---|---|---|
| 1 | 20 | 5 | 10 | $2^{100}$ |
| 2 | 20 | 10 | 10 | $2^{200}$ |
| 3 | 50 | 15 | 20 | $2^{750}$ |
| 4 | 50 | 15 | 40 | $2^{750}$ |
| 5 | 50 | 25 | 20 | $2^{1250}$ |
| 6 | 50 | 25 | 40 | $2^{1250}$ |
| 7 | 100 | 15 | 20 | $2^{1500}$ |
| 8 | 100 | 15 | 40 | $2^{1500}$ |
| 9 | 100 | 25 | 20 | $2^{2500}$ |
| 10 | 100 | 25 | 40 | $2^{2500}$ |
| 11 | 200 | 25 | 40 | $2^{5000}$ |
| 12 | 200 | 25 | 80 | $2^{5000}$ |
| 13 | 200 | 40 | 40 | $2^{8000}$ |
| 14 | 200 | 40 | 80 | $2^{8000}$ |

HyperVolume (HV) and Inverted Generational Distance (IGD) were used as performance metrics to evaluate the diversity and quality of solutions produced by four algorithms (NSGAII, BMOPSOCD, D&C NSGAII and D&C BMOPSOCD). HV is a measure which reflects the volume enclosed by a solution set and a reference point. A larger HV value indicates a better solution set. IGD is a modified version of Generational Distance (GD) which estimates how far the elements in the true Pareto front are from those in the non-dominated set produced by an algorithm. IGD calculates the sum of the distances from each point within the true Pareto front to the nearest point within the non-dominated set produced by an algorithm. A lower IGD value indicates a better quality solution set. However, for calculating the IGD value, a true Pareto front is required, and for the problem being addressed, the true Pareto front is unknown. Therefore, an approximated Pareto front was considered by combining all solutions produced by four algorithms and then by applying a non-dominated sorting to obtain the final non-dominated set.

Parameter values used for each algorithm considered in the evaluation are shown in Table 6.

TABLE 6

| Parameter | NSGAII | NSGAII with Method 200 (referred as D&C NSGAII) |
|---|---|---|
| Population size | 250 | 20 |
| Chromosome size | s.n | n |
| Tournament size | 3 | 3 |
| Crossover probability | 0.8 | 0.8 |
| Mutation probability | 0.2 | 0.2 |
| Maximum generations | 250 | 40 |

| Parameter | BMOPSOCD | BMOPSOCD with method 200 (referred as D&C BMOPSOCD) |
|---|---|---|
| Population size | 250 | 20 |
| Archive size | 250 | 20 |
| Inertia | 0.4 | 0.4 |
| Personal best c1 | 1 | 1 |
| Swarm best c2 | 1 | 1 |
| Mutation probability | 0.5 | 0.5 |
| Maximum generations | 250 | 40 |

The parameter values for NSGAII algorithm were selected empirically, that is, several values for parameters were tried, and it was observed whether the solutions have converged (have similar fitness values between two consecutive generations). Same values of crossover probability (0.8) and mutation probability (0.2) were used for D&C NSGAII. The size of a chromosome used for NSGAII is s·n, where s is the number of web services and n is the number of candidate locations. Since the NSGAII using the method 200 (referred as D&C NSGAII) solves the location allocation for each web service independently, the size of a chromosome in this case is just n. Generally, the population size is related to the search space, A larger population size denotes a stronger search ability because more space can be explored. As the search space of NSGAII is larger $2^{s \cdot n}$, a population size of 250 was used. As the search space of NSGAII using the method 200 is smaller 2n, a smaller population of size 20 was used. Further, the maximum number of iterations for NSGAII was set to 250 whereas for NSGAII using the method 200, it was set to 40. The experiment was conducted focusing on the effectiveness of the approach in method 200 instead of selecting the best parameterset.

For BMOPSOCD algorithm, selected parameter values were used. The value of static inertia weight w was set to 0.4 and the mutation probability was set to 0.5. The parameters c1 and c2 were both set to 1. Hence, particle's personal best and swarm's global best had an equal influence on the swarm. The archive size and population size were both set to 250. The parameters used for BMOPSOCD for the method 200 (referred as D&C BMOPSOCD) were same except for the population size, archive size and the number of generations. As the search space of the approach in method 200 is smaller, the population size and archive size were set to 20, and the number of generations to 40.

The two objective functions (latency and cost) were normalized between 0 and 1. The point (1, 1) is the extreme point of objective values. (1, 1) was used as the reference point in calculating HV. For each experiment, the method 200 was run ten times independently. The best results of all the runs were compared. To obtain the best result of ten runs, the results of all ten runs were combined and sorted by the non-dominated values.

Figure 6A:
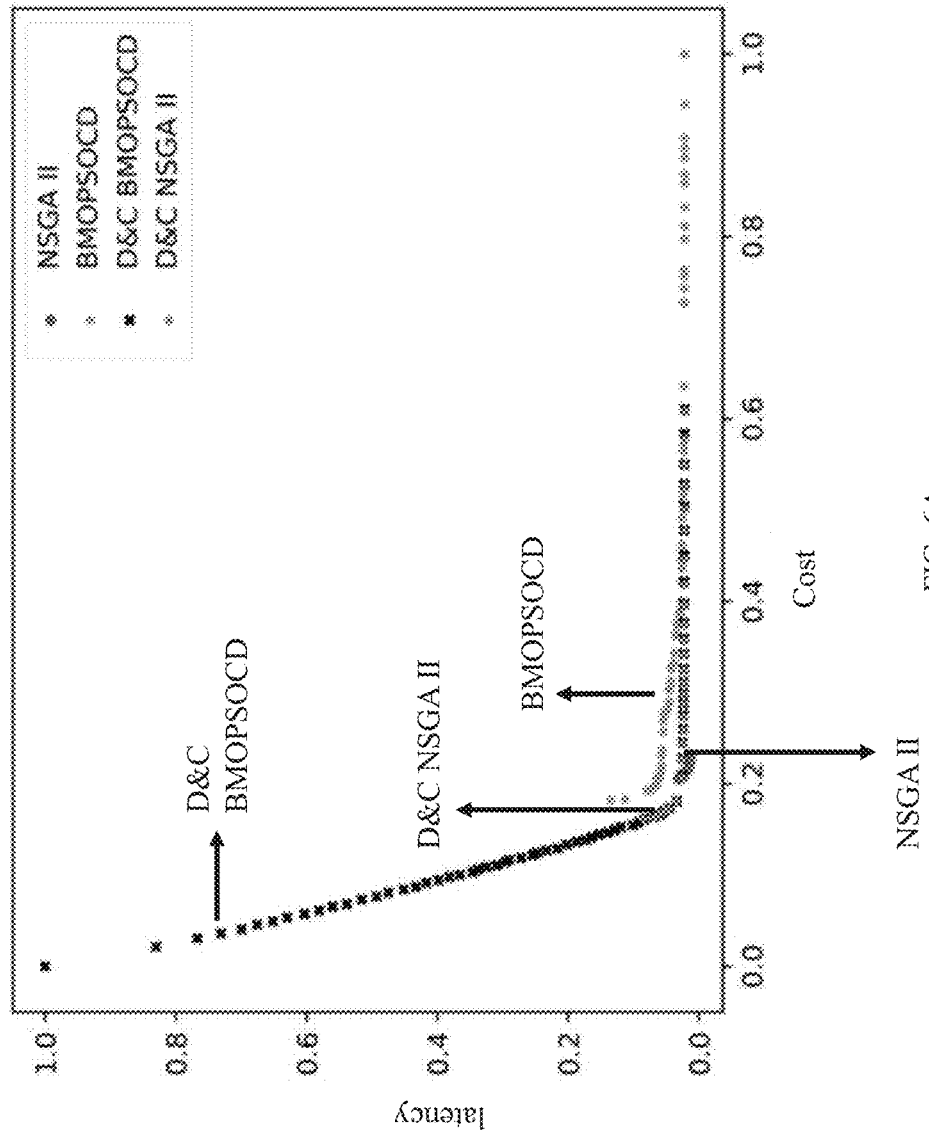
FIGS. 6A and 6B are graphs plotting example values to depict efficiency of the method 200, in accordance with some embodiments of the present disclosure.

The values were plotted in a graph format (an example for instance 3 is depicted in FIG. 6A), and it indicated that the techniques NSGAII and BMOPSOCD, when adopted the method 200, are able to find better and diverse solutions than standard NSGAII and BMOPSOCD. Table 7 shows HV values and Table 6 shows IGD values calculated using non-dominated solutions obtained by each algorithm for all fourteen instances. A larger HV value indicates a better and diverse solution set. A lower IGD value indicates a better quality solution set. From the values in the tables (Tables 7 and 8), it is clear that solutions obtained using the method 200 were comparatively better than the state of-the-art NSGAll and BMOPSOCD algorithms in terms of both quality and diversity.

TABLE 7

| | NSGA II | | NSGA with method 200 | | BMOPSOCD | | BMOPSOCD with method 200 | |
|---|---|---|---|---|---|---|---|---|
| Instance | Mean | Std | Mean | Std | Mean | Std | Mean | Std |
| Instance 1 | 0.72 | 0.030 | 0.82 | 0.006 | 0.78 | 0.013 | 0.96 | 3.1E−03 |
| Instance 2 | 0.68 | 0.068 | 0.92 | 2.1E−03 | 0.89 | 0.007 | 0.90 | 03 |
| Instance 3 | 0.55 | 0.092 | 0.95 | 2.8E−04 | 0.89 | 0.006 | 0.97 | 1.0E−03 |
| Instance 4 | 0.56 | 0.089 | 0.95 | 2.4E−04 | 0.90 | 0.008 | 0.97 | 03 |
| Instance 5 | 0.54 | 0.100 | 0.97 | 7.7E−04 | 0.93 | 0.005 | 0.98 | 8.8E−04 |
| Instance 6 | 0.55 | 0.098 | 0.97 | 5.5E−04 | 0.93 | 0.004 | 0.98 | 04 |
| Instance 7 | 0.54 | 0.094 | 0.95 | 2.4E−04 | 0.86 | 0.010 | 0.98 | 4.9E−03 |
| Instance 8 | 0.55 | 0.090 | 0.95 | 1.7E−04 | 0.87 | 0.009 | 0.97 | 03 |
| Instance 9 | 0.54 | 0.098 | 0.97 | 4.4E−04 | 0.90 | 0.007 | 0.97 | 1.4E− |

TABLE 7-continued

| Instance | NSGA II Mean | NSGA II Std | NSGA with method 200 Mean | NSGA with method 200 Std | BMOPSOCD Mean | BMOPSOCD Std | BMOPSOCD with method 200 Mean | BMOPSOCD with method 200 Std |
|---|---|---|---|---|---|---|---|---|
| Instance 10 | 0.54 | 0.099 | 0.96 | 5.0E-04 | 0.91 | 0.005 | 0.98 | 1.3E-03 |
| Instance 11 | 0.51 | 0.003 | 0.96 | 5.5E-04 | 0.88 | 0.007 | 0.98 | 4.4E-04 |
| Instance 12 | 0.51 | 0.004 | 0.96 | 7.5E-04 | 0.89 | 0.006 | 0.98 | 6.2E-04 |
| Instance 13 | 0.51 | 0.002 | 0.95 | 1.4E-03 | 0.92 | 0.004 | 0.98 | 9.1E-04 |
| Instance 14 | 0.51 | 0.002 | 0.94 | 1.5E-03 | 0.92 | 0.004 | 0.98 | 1.1E-03 |

Additional std values appearing in column: 5.2E-04, 5.7E-04, 7.6E-04, 9.5E-04

TABLE 8

| Instance | NSGA II Mean | NSGA II Std | NSGA with method 200 Mean | NSGA with method 200 Std | BMOPSOCD Mean | BMOPSOCD Std | BMOPSOCD with method 200 Mean | BMOPSOCD with method 200 Std |
|---|---|---|---|---|---|---|---|---|
| Instance 1 | 0.19 | 0.018 | 0.14 | 0.000 | 0.15 | 0.009 | 5.1E-04 | 1.7E-05 |
| Instance 2 | 0.17 | 0.039 | 0.07 | 0.002 | 0.07 | 0.004 | 6.6E-04 | 1.3E-04 |
| Instance 3 | 0.34 | 0.066 | 0.05 | 0.005 | 0.09 | 0.005 | 1.7E-04 | 1.7E-05 |
| Instance 4 | 0.25 | 0.050 | 0.04 | 0.007 | 0.05 | 0.007 | 1.4E-04 | 1.0E-05 |
| Instance 5 | 0.32 | 0.070 | 0.03 | 0.005 | 0.04 | 0.005 | 2.1E-04 | 2.0E-05 |
| Instance 6 | 0.30 | 0.067 | 0.03 | 0.004 | 0.04 | 0.005 | 1.9E-04 | 1.9E-05 |
| Instance 7 | 0.39 | 0.070 | 0.08 | 0.011 | 0.13 | 0.013 | 8.9E-05 | 1.3E-05 |
| Instance 8 | 0.26 | 0.050 | 0.04 | 0.008 | 0.07 | 0.008 | 7.2E-05 | 5.1E-06 |
| Instance 9 | 0.28 | 0.060 | 0.03 | 0.003 | 0.04 | 0.004 | 2.1E-04 | 1.6E-05 |
| Instance 10 | 0.30 | 0.062 | 0.04 | 0.009 | 0.05 | 0.009 | 9.6E-05 | 5.8E-06 |
| Instance 11 | 0.27 | 0.008 | 0.04 | 0.007 | 0.05 | 0.007 | 1.3E-04 | 9.3E-06 |
| Instance 12 | 0.26 | 0.007 | 0.04 | 0.004 | 0.05 | 0.004 | 1.2E-04 | 6.8E-06 |
| Instance 13 | 0.30 | 0.007 | 0.04 | 0.007 | 0.04 | 0.006 | 3.0E-04 | 2.8E-05 |
| Instance 14 | 0.28 | 0.006 | 0.04 | 0.005 | 0.03 | 0.005 | 2.9E-04 | 2.9E-05 | b. Results to prove efficacy of the VM allocation done by the system 100

An application or problem instance called nug22-sbb, which is computationally intensive, was considered to perform the experiment. The following resource requirements were considered from the user for this specific application: M=77 GB, S=51 GB, R=5067533 GFLOPS (per time period t), T=12 hrs, B=343$. A suitable cloud provider was selected, where a diverse range of resources were offered for proper execution of the application. In this experiment, five types of VMs were chosen as the probable set of resources that possess the specification as shown in Table 9. The maximum number of VMs is considered to be the same ($N_M$=30) for all types or configurations.

TABLE 9

| Type | $v_c$ ($/hr) | $s_c$ (GB) | $m_c$ (GB) | $r_c$ (MFLOPS) |
|---|---|---|---|---|
| c3.large | 0.105 | 32 | 3.75 | 8800 |
| c3.xlarge | 0.210 | 80 | 7.5 | 17600 |
| c3.2xlarge | 0.420 | 160 | 15 | 35200 |
| c3.3xlarge | 0.840 | 320 | 30 | 70400 |
| c3.4xlarge | 1.680 | 640 | 60 | 140800 |

Deterministic VM Allocation Using NSGA-II

For the described application with specified user requirements, the objective of the experiment was to identify the optimal configuration of VMs at each time period, from a set of VMs. To accomplish this, the constrained two-objective optimization problem was solved using a well-known evolutionary optimization algorithm called NSGA-II. since NSGA-II has the capability of providing near-global-optimal solutions. Being a population based evolutionary optimizer, NSGA-II generates all the optimal solutions in a single simulation run, which are also called as Pareto-Optimal (PO) solutions.

Consequently, the deterministic VM allocation was solved using binary coded NSGA-II with number of populations=500, number of generations=500, crossover probability=0.9 and mutation probability=0.01. From the obtained two dimensional Pareto front, it was observed that even though the maximum allowable execution time is 12 hours, the application was able to complete it by 10 hours (maximum value of TE), with the purchasing cost remaining low and well within the budget limit. From the obtained PO solutions, a cloud broker may choose any one solution based on a higher order information such as, select the resource that is situated closer to the users' location (might help in reducing communication cost). For illustration purpose, one of the PO solutions has been selected and its corresponding decision variables are presented in Table 8 for each specific type of VM provided by Amazon. The number of VMs are reported for a period of three hours each. It was observed that a total of 43 VMs were required for executing the considered scientific workflow. Moreover, the number of VMs chosen at each time instance (represented for a three hour window in Table 10) do not follow any specific pattern and one of the configurations of VMs, that is, c3.4x large VMs, were not allocated in the entire time horizon. This shows that optimal VM allocation is a non-trivial exercise and plays a major role in the enterprises' growth of the cloud provider.

TABLE 10

| | Time periods | | | |
|---|---|---|---|---|
| | 1-3 | 4-6 | 7-9 | 10-12 |
| | Number of VMs | | | |
| c3.large | 1 | 9 | 5 | 0 |
| c3.xlarge | 2 | 8 | 2 | 0 |
| c3.2xlarge | 5 | 7 | 0 | 0 |
| c3.3xlarge | 1 | 3 | 0 | 0 |
| c3.4xlarge | 0 | 0 | 0 | 0 |

Stochastic VM Allocation Using CCP and NSGA-II

The same application or problem instance has been analyzed in this section, but with the inclusion of uncertainties in the demand requirements from the user. The deterministic values that were used previously were allowed to deviate by 20% for obtaining the bounds on the uncertain parameters. In a practical scenario, these bounds are usually provided by the user or cloud broker. Now, it is assumed that the four uncertain parameters follow normal distribution and the probability of constraint satisfaction (p) is set to 0.75. Subsequently, CCP was applied for solving the stochastic optimization problem of VM allocation, which is again multi-objective. On converting this stochastic formulation into equivalent deterministic optimization problem and solving it using NSGA-II, the two dimensional Pareto optimal front was obtained. On comparison with the deterministic solution, it was observed that the solution quality is improved with respect to both the objective function values.

Considering one of the PO solutions, the attained decision variables were generated, which correspond to each type of VM over entire time horizon (represented for a three hour window). In this case, a total of 30 VMs or resources were required for execution, which is less in number as compared to deterministic case. Further, c3.2xlarge VMs were not allocated in the entire time horizon and c3.4xlarge VMs were allocated as opposed to deterministic solutions, which implies that consideration of uncertainty plays an important role in the selection of optimal VMs. Sample results obtained for the stochastic VM allocation using CCP and NSGA II are given in Table. 11.

TABLE 11

|  | Time periods | | | |
| --- | --- | --- | --- | --- |
|  | 1-3 | 4-6 | 7-9 | 10-12 |
|  | Number of VMs | | | |
| c3. large | 3 | 7 | 0 | 0 |
| c3.xlarge | 8 | 1 | 3 | 0 |
| c3.2xlarge | 0 | 0 | 0 | 0 |
| c3.3xlarge | 0 | 2 | 3 | 0 |
| c3.4xlarge | 0 | 0 | 3 | 0 |

Figure 6B:
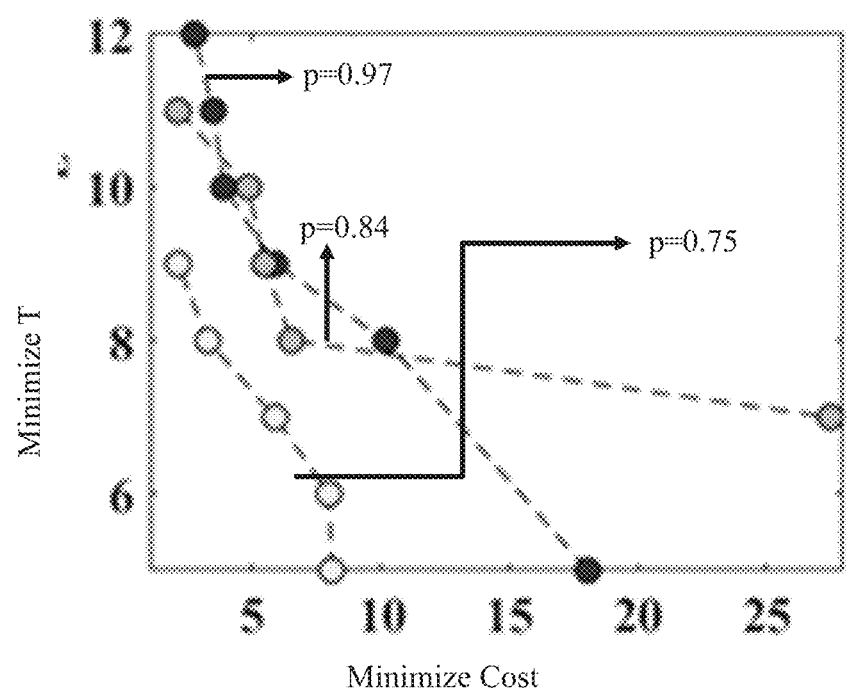

Additionally, in order to study the effect of probability of constraint satisfaction (p), the value of p is varied from 0.75 to 1 and the corresponding solutions were plotted in a graph format (FIG. 6B). It was observed that as the p value increases, the solution quality varies, sometimes deteriorates as well but then the reliability of the solution is more. However, choosing a too high value of p might lead to conservative solutions and on the other hand, a smaller p value is also not suggestable. Therefore, the cloud broker must decide on the probability value to be considered.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent dements with insubstantial differences from the literal language of the claims.

The embodiments of present disclosure herein address unresolved problem of determining a solution for a web services location allocation problem (WSLAP) and VM allocation. The embodiment, thus provides a mechanism for generating the solution for the WSLAP, by merging a plurality of sub-solutions using a merging process. The embodiment, thus provides a mechanism for performing Virtual Machine (VM) allocation and deployment, by using a stochastic approach.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g, hardware means like e.g, an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of performing web services location allocation, comprising:
collecting a Web Service Location Allocation Problem (WSLAP) as input, via one or more hardware processors;
identifying a plurality of web-services that are associated with the WSLAP, via the one or more hardware processors;
decomposing the WSLAP to a plurality of sub-problems, via the one or more hardware processors, by treating each of the plurality of web services as a sub-problem;
determining at least one non-dominating solution to each of the plurality of sub-problems, to obtain a plurality of non-dominating solutions to the plurality of sub-problems, via the one or more hardware processors; and
generating a solution to the obtained WSLAP by merging the plurality of the non-dominating solutions, via the one or more hardware processors, wherein the solution determines a plurality of locations in a cloud space where a plurality of VM resources providing the plurality of web-services are to be deployed according to a users' locations and invocation frequencies.

2. The method as claimed in claim 1, wherein merging the plurality of the non-dominating solutions to generate the solution to the WSLAP comprises:
generating a plurality of sub-solutions by merging two of the plurality of the non-dominating solutions at once, wherein generating each of the plurality of sub-solutions comprising:
collecting a first set of non-dominated solutions (E1) and a second set of non-dominated solutions (E2), as input data to construct a solution table, wherein in the solution table a plurality of solutions are listed such that position of each solution in the solution table is represented using a unique combination of a row number and a column number, wherein the row number is an index from E2 and column number is an index from E1, further wherein value of element at any position in the solution table is a vector sum of values in E1 and E2 at respective locations;
initializing a stack N;
pushing a dummy solution to the stack;
generating a first tuple as a summation of first non-dominating solutions in E1 and E2, and adding the first tuple to a Heap H, starting from top left corner of the solution table, wherein the first tuple comprises a summation of first objective (f1) and a second objective (f2) of the first non-dominating solutions in E1 and E2;
iteratively performing till the sub-solution is generated:
removing a root node from the Heap H, wherein the root node contains lowest value of all elements of $f_1$ present in the Heap;
pushing the removed root node to the stack, if value of $f_2$ in the root node is less than value of $f_2$ in top of the stack;
for the root node:
selecting one or more solutions from the tuples in the solution table, wherein the one or more solutions are in a location that is to immediate right or immediate bottom to the location of the value in the root node; and
adding the selected one or more solutions to the Heap; and
merging the plurality of sub-solutions to generate the solution for the WSLAP.

3. The method as claimed in claim 2, wherein the first tuple is generated as a summation of the last non-dominating solutions in E1 and E2, starting from bottom right corner of the solution table, wherein for the root node the one or more solutions in a location that is to immediate left or immediate top to the location of the value in the root node are selected and added to the Heap.

4. The method as claimed in claim 3, wherein the first tuple is generated by performing in parallel, selection of the non-dominating solutions starting from a) bottom right corner of the solution table and b) top left corner of the solution table.

5. The method as claimed in claim 1, wherein a VM allocation is performed based on the generated solution to the WSLAP problem, comprising:
obtaining a VM deployment requirement, wherein in the VM deployment requirement, resource requirements are dynamically varying; and
determining a plurality of optimal VM resources from among the plurality of resources in the cloud space, using a stochastic approach, wherein the plurality of optimal VM resources satisfy criteria defined in terms of purchasing cost, storage capacity,
processing capacity, maximum limit on number of VMs, and execution time, such that the dynamically varying resource requirements are satisfied.

6. A system of performing web service location allocation, comprising:
one or more hardware processors;
a communication interface; and
a memory operatively coupled to the one or more hardware processors via the communication interface, wherein the memory storing a plurality of instructions, which when executed, causes the one or more hardware processors to:
collect a Web Service Location Allocation Problem (WSLAP) as input;
identify a plurality of web-services that are associated with the WSLAP;
decompose the WSLAP to a plurality of sub-problems, by treating each of the plurality of web services as a sub-problem;
determine at least one non-dominating solution to each of the plurality of sub-problems, to obtain a plurality of non-dominating solutions to the plurality of sub-problems; and
generate a solution to the obtained WSLAP by merging the plurality of the non-dominating solutions, wherein the solution determines a plurality of locations in a cloud space where a plurality of VM resources providing the plurality of web-services are to be deployed according to a users locations and invocation frequencies.

7. The system as claimed in claim 6, wherein the system merges the plurality of the non-dominating solutions to generate the solution to the WSLAP by:
   generating a plurality of sub-solutions by merging two of the plurality of the non-dominating solutions at once, wherein generating each of the plurality of sub-solutions comprising:
   collecting a first set of non-dominated solutions (E1) and a second set of non-dominated solutions (E2), as input data to construct a solution table, wherein in the solution table a plurality of solutions are listed such that position of each solution in the solution table is represented using a unique combination of a row number and a column number, wherein the row number is an index from E2 and column number is an index from E1, further wherein value of element at any position in the solution table is a vector sum of values in E1 and E2 at respective locations;
   initializing a stack N;
   pushing a dummy solution to the stack;
   generating a first tuple as a summation of last non-dominating solutions in E1 and E2, and adding the first tuple to a Heap H, starting from top left corner of the solution table, wherein the first tuple comprises a summation of first objective (f1) and a second objective (f2) of the first non-dominating solutions in E1 and E2;
   iteratively performing till the sub-solution is generated:
      removing a root node from the Heap H, wherein the root node contains lowest value of all elements of $f_1$ present in the Heap;
      pushing the removed root node to the stack, if value of $f_2$ in the root node is less than value of $f_2$ in top of the stack; for the root node:
         selecting one or more solutions from the tuples in the solution table, wherein the one or more solutions are in a location that is to immediate right or immediate bottom to the location of the value in the root node; and
         adding the selected one or more solutions to the Heap; and
   merging the plurality of sub-solutions to generate the solution for the WSLAP.

8. The system as claimed in claim 7, wherein the system generates the first tuple as a summation of the last non-dominating solutions in E1 and E2, starting from bottom right corner of the solution table, wherein for the root node the one or more solutions in a location that is to immediate left or immediate top to the location of the value in the root node are selected and added to the Heap.

9. The system as claimed in claim 8, wherein the system generates the first tuple by performing in parallel, selection of the non-dominating solutions, starting from a) bottom right corner of the solution table and b) top left corner of the solution table.

10. The system as claimed in claim 6, wherein the system performs a VM allocation based on the generated solution to the WSLAP problem, by:
    obtaining a VM deployment requirement, wherein in the VM deployment requirement, resource requirements are dynamically varying; and
    determining a plurality of optimal VM resources from among the plurality of resources in the cloud space, using a stochastic approach, wherein the plurality of optimal VM resources satisfy criteria defined in terms of purchasing cost, storage capacity, processing capacity, maximum limit on number of VMs, and execution time, such that the dynamically varying resource requirements are satisfied.

11. A non-transitory computer readable medium for performing web services location allocation, comprising:
    collecting a Web Service Location Allocation Problem (WSLAP) as input, via one or more hardware processors;
    identifying a plurality of web-services that are associated with the WSLAP, via the one or more hardware processors;
    decomposing the WSLAP to a plurality of sub-problems, via the one or more hardware processors, by treating each of the plurality of web services as a sub-problem;
    determining at least one non-dominating solution to each of the plurality of sub-problems, to obtain a plurality of non-dominating solutions to the plurality of sub-problems, via the one or more hardware processors; and
    generating a solution to the obtained WSLAP by merging the plurality of the non-dominating solutions, via the one or more hardware processors, wherein the solution determines a plurality of locations in a cloud space where a plurality of VM resources providing the plurality of web-services are to be deployed according to a users' locations and invocation frequencies.

12. The non-transitory computer readable medium as claimed in claim 11, wherein merging the plurality of the non-dominating solutions to generate the solution to the WSLAP comprises:
    generating a plurality of sub-solutions by merging two of the plurality of the non-dominating solutions at once, wherein generating each of the plurality of sub-solutions comprising:
    collecting a first set of non-dominated solutions (E1) and a second set of non-dominated solutions (E2), as input data to construct a solution table, wherein in the solution table a plurality of solutions are listed such that position of each solution in the solution table is represented using a unique combination of a row number and a column number, wherein
    the row number is an index from E2 and column number is an index from E1, further wherein value of element at any position in the solution table is a vector sum of values in E1 and E2 at respective locations;
    initializing a stack N;
    pushing a dummy solution to the stack;
    generating a first tuple as a summation of first non-dominating solutions in E1 and E2, and adding the first tuple to a Heap H, starting from top left corner of the solution table, wherein the first tuple comprises a summation of first objective (f1) and a second objective (f2) of the first non-dominating solutions in E1 and E2;
    iteratively performing till the sub-solution is generated:
       removing a root node from the Heap H, wherein the root node contains lowest value of all elements of $f_1$ present in the Heap;

pushing the removed root node to the stack, if value of $f_2$ in the root node is less than value of $f_2$ in top of the stack;

for the root node:

selecting one or more solutions from the tuples in the solution table, wherein the one or more solutions are in a location that is to immediate right or immediate bottom to the location of the value in the root node; and adding the selected one or more solutions to the Heap; and merging the plurality of sub-solutions to generate the solution for the WSLAP.

13. The non-transitory computer readable medium as claimed in claim 12, wherein the first tuple is generated as a summation of the last non-dominating solutions in E1 and E2, starting from bottom right corner of the solution table, wherein for the root node the one or more solutions in a location that is to immediate left or immediate top to the location of the value in the root node are selected and added to the Heap.

14. The non-transitory computer readable medium as claimed in claim 13, wherein the first tuple is generated by performing in parallel, selection of the non-dominating solutions starting from a) bottom right corner of the solution table and b) top left corner of the solution table.

15. The non-transitory computer readable medium as claimed in claim 11, wherein a VM allocation is performed based on the generated solution to the WSLAP problem, comprising:

obtaining a VM deployment requirement, wherein in the VM deployment requirement, resource requirements are dynamically varying; and determining a plurality of optimal VM resources from among the plurality of resources in the cloud space, using a stochastic approach, wherein the plurality of optimal VM resources satisfy criteria defined in terms of purchasing cost, storage capacity, processing capacity, maximum limit on number of VMs, and execution time, such that the dynamically varying resource requirements are satisfied.

* * * * *